United States Patent [19]
Bearden et al.

[11] Patent Number: 5,373,461
[45] Date of Patent: Dec. 13, 1994

[54] DATA PROCESSOR A METHOD AND APPARATUS FOR PERFORMING POSTNORMALIZATION IN A FLOATING-POINT EXECUTION UNIT

[75] Inventors: David R. Bearden; Raymond L. Vargas, both of Austin, Tex.

[73] Assignee: Motorola, Inc., Schaumburg, Ill.

[21] Appl. No.: 339

[22] Filed: Jan. 4, 1993

[51] Int. Cl.$^5$ .............................................. G06F 7/38
[52] U.S. Cl. ................................ 364/748; 364/715.04; 364/745
[58] Field of Search ..................... 364/745, 748, 715.04

[56] References Cited

U.S. PATENT DOCUMENTS

| | | | |
|---|---|---|---|
| 4,999,803 | 3/1991 | Turrini et al. | 364/748 |
| 5,111,421 | 5/1992 | Molnar et al. | 364/748 |
| 5,136,536 | 8/1992 | Ng | 364/748 |
| 5,197,023 | 3/1993 | Nakayama | 364/748 |

*Primary Examiner*—Tan V. Mai
*Assistant Examiner*—Chvong D. Ngo
*Attorney, Agent, or Firm*—Charlotte B. Whitaker

[57] ABSTRACT

A method and apparatus for performing prenormalization during execution by an execution unit (100) of a floating-point add/subtract operation using two data operands. The execution unit (100) adds a mantissa portion of a first and a second floating-point data operand to generate a prenormalized mantissa sum. The execution unit (100) minimizes critical path delays to allow high-performance floating-point calculations while simultaneously reducing logic. Instead of treating the prenormalized mantissa sum as a 64-bit value with special treatment in case of a carry out due to overflow, the floating-point adder 100 treats the prenormalized mantissa sum as a 65-bit value, with the most significant bit being a carry output. Instead of conditionally incrementing an initial exponent value, the initial exponent value is always incremented. Thus, allowing the floating-point adder unit 100 to perform the exponent adjustments for normalization and for rounding faster.

13 Claims, 5 Drawing Sheets

DATA PROCESSOR A METHOD AND APPARATUS FOR PERFORMING POSTNORMALIZATION IN A FLOATING-POINT EXECUTION UNIT

FIELD OF THE INVENTION

This invention relates generally to data processors and specifically to data processors which perform floating-point operations.

BACKGROUND OF THE INVENTION

State of the art microprocessor designs continue to integrate operation-specific execution units (e.g. pixel-processing units, floating-point dividers and multipliers) on a single chip. Since these operation-specific execution units are tuned to perform specific tasks, their use typically improves a microprocessor's overall performance. The drive for higher performance is especially evident in floating-point computations, and typically, superior floating-point performance is key to microprocessor competitiveness. Among the problems associated with floating-point computations is the handling of mantissa overflow, mantissa postnormalization, and exponent adjustment in the execution of floating-point addition and subtraction operations. This invention provides a method for performing these functions in a unified manner that simplifies the logic and removes critical paths.

The algorithm for floating-point addition and subtraction is well understood. The required operations is performed in five steps which are as follows: (1) Align the operands; (2) Add/Subtract the two mantissas; (3) Postnormalize: (a) if the result of the addition/subtraction overflows, then shift the mantissa right one bit place and increment the exponent; or (b) remove the leading zeros of the addition/subtraction result by performing a left shift, and decrementing the exponent by an amount equal to the number of leading zeros; and (4) A rounding operation is then performed by rounding the result from the postnormalization stage according to the rounding mode; if the mantissa overflows as a result, shift right one place and increment the intermediate exponent. Lastly, the result is checked for exponent underflow/overflow.

Figure 1:
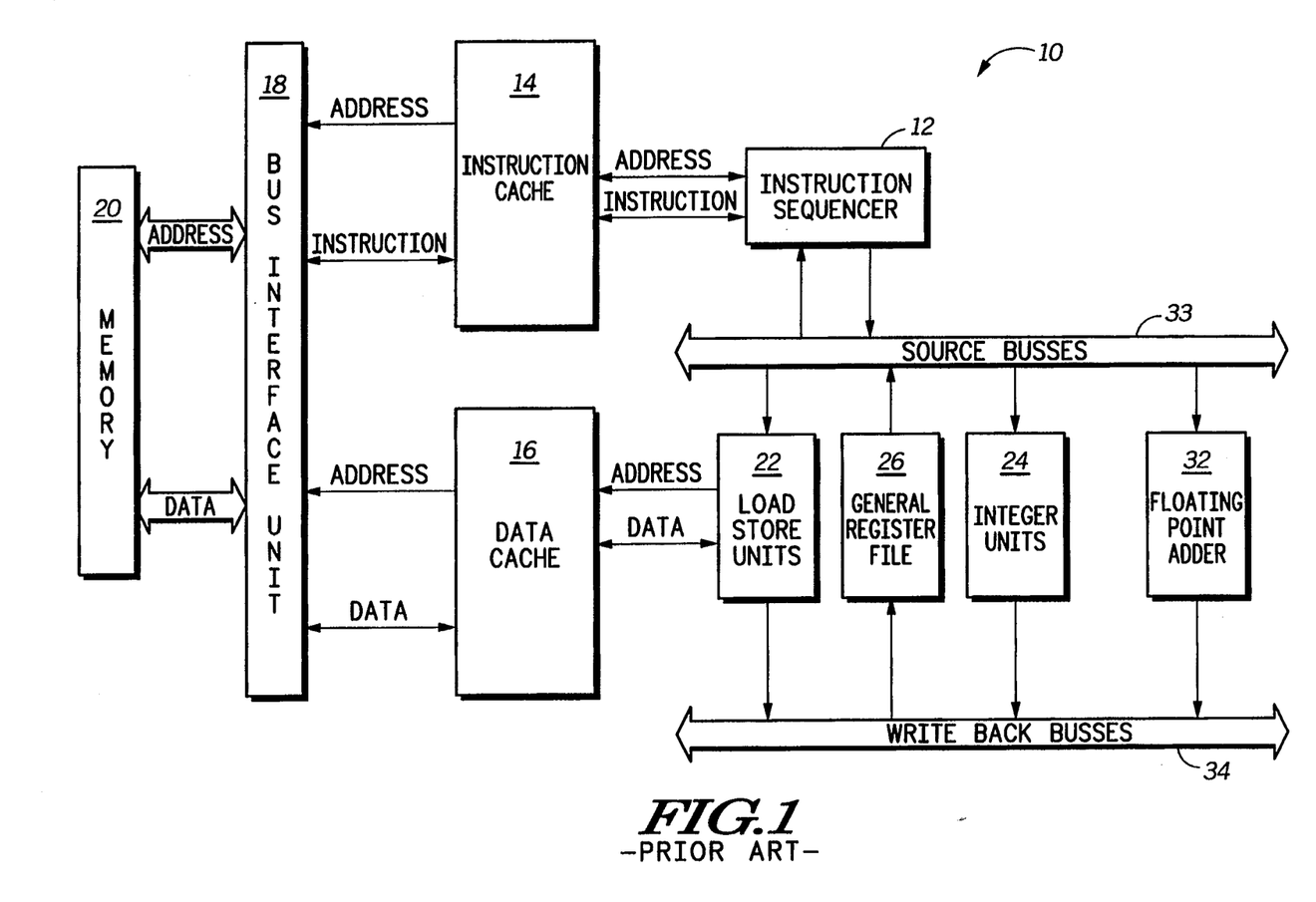
FIG. 1 illustrates, in block diagram form, a data processing system having a conventional floating-point adder unit for performing a floating-point add operation.
Figure 2:
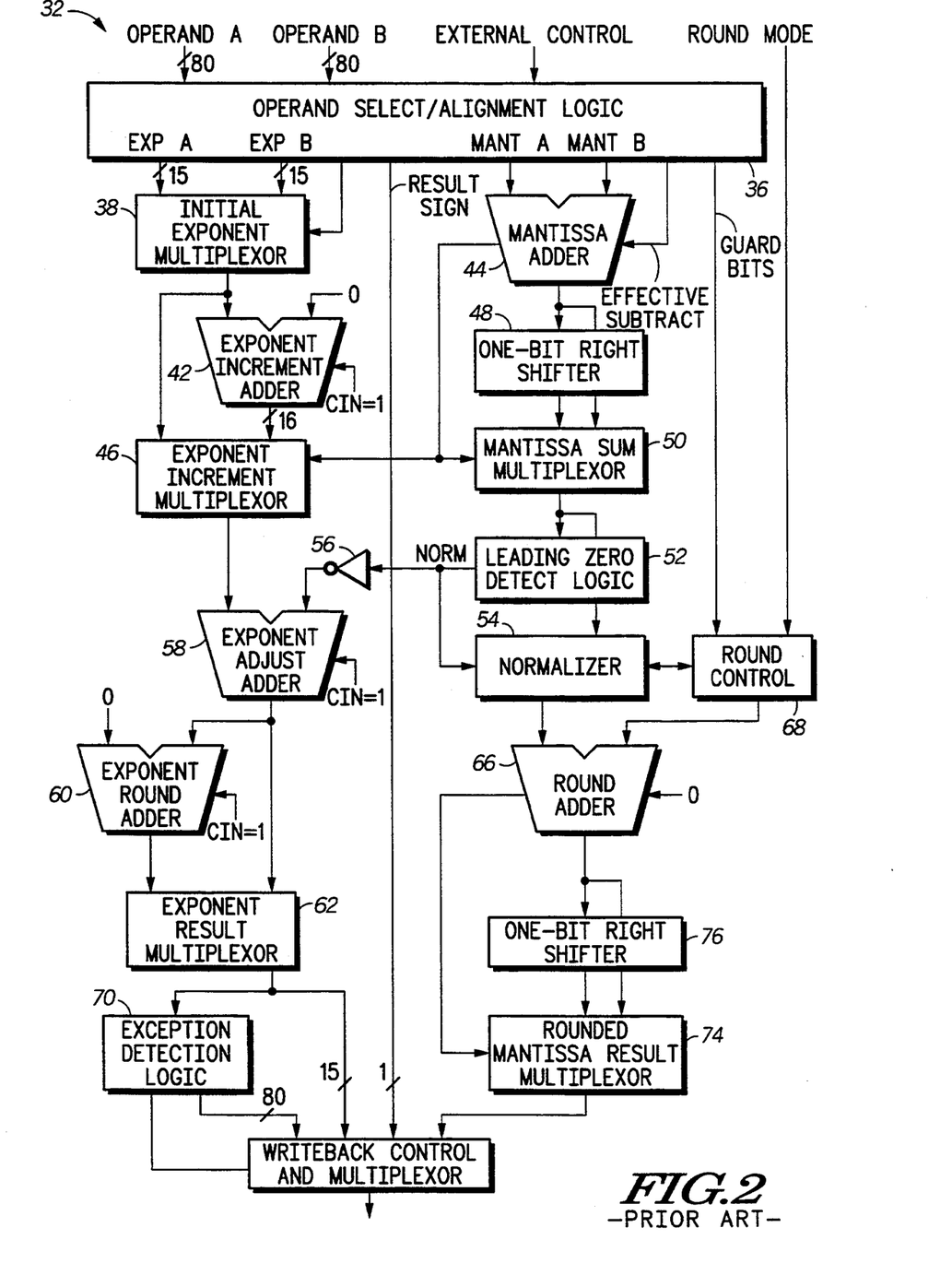
FIG. 2 illustrates, in block diagram form, the conventional floating-point adder unit of FIG. 1.

FIG. 1 illustrates a data processing system 10 having a conventional floating-point adder unit 32 for performing a floating-point addition/subtraction operation. Illustrated in FIG. 2 is a block diagram of a known floating-point adder unit 32. Typically, operand select/alignment logic 36 aligns the binary points of two floating-point numbers (OPERAND A, OPERAND B), received from the source busses 33, so that the exponents of the floating-point numbers will be equal in magnitude. This is accomplished by shifting the mantissa of the floating-point number with the smaller exponent to the right by a number of bit positions equivalent in magnitude to the exponent difference between the two floating-point numbers. The appropriately aligned mantissa values are shown entering the mantissa adder 44, while the larger exponent is selected by an initial exponent multiplexor as the initial exponent result. The operand select/alignment logic 36 may swap the mantissa values (MANTA and MANTB) to insure that in cases of an effective subtraction, the smaller mantissa value is subtracted from the larger mantissa value. This ensures that the result from the mantissa adder 44 is always a positive result, and hence will not require complementation. The mantissa adder 44 adds the two mantissa values (MANTA and MANTB) to generate an initial mantissa sum and a carry output signal.

In cases of effective addition, the output of the mantissa adder 44 may overflow. A right shifter 48 is used to shift the mantissa sum to the right by one bit position. A mantissa sum multiplexor 50, controlled by the carry output from adder 44, is used to select a prenormalized mantissa sum from either the right-shifted mantissa value or the initial mantissa sum. In parallel with the mantissa addition, the initial exponent is incremented by exponent increment adder 42 to generate an incremented exponent. An exponent increment multiplexor 46, also controlled by the carry output from adder 44, selects an intermediate exponent value from either the initial exponent or the incremented exponent.

In cases of effective subtraction, the output of the mantissa adder 44 must be normalized by eliminating any leading zero-bits in the prenormalized mantissa sum selected by the mantissa sum multiplexor 50. For each bit position that the prenormalized mantissa sum is shifted to the left, the exponent must be decremented by one. The leading-zero-detect logic 52 inspects the prenormalized mantissa sum to determine the number of leading zeros. The encoded output of the leading-zero-detect logic 52 is used to control the normalizer 54 (for left shifting the prenormalized mantissa sum), and is provided as an input to exponent adjust adder 58 (for adjusting the exponent value). The exponent adjust adder 58 subtracts the number of leading zeros (determined by the leading-zero-detect logic 52) from the intermediate exponent.

Once the normalization has been performed, the rounding operation proceeds. Depending upon the current rounding mode and any guard bits resulting from the mantissa alignment performed by the operand select/alignment logic 36, the rounding logic control 68 provides a ROUND control signal, indicating whether or not the mantissa should be incremented, to an adder 66. Accordingly, the ROUND signal can be used as the carry-in to adder 66 to effectively increment the mantissa, thereby generating a "rounded" mantissa. It is possible, therefore, that the rounded mantissa may overflow necessitating a right-shifting of the mantissa by one bit position, and the incrementing of the exponent. These functions are implemented via a right shifter 76 and exponent round adder 60, respectively. The exponent result multiplexor 62 and rounded mantissa result multiplexor 74 are used to select the result exponent, and postnormalized mantissa, respectively.

In FIG. 2, it should be noted that known optimizations are incorporated into adder 32 to improve performance. For example, in both cases where the mantissa may overflow, the exponent value is unconditionally incremented by adders 42 and 60, and the intermediate and result exponent values, respectively, are selected based upon the adder carry outputs (provided by mantissa adders 44 and 66) which control the associated exponent multiplexors 46 and 62, respectively. These optimization improve the performance of the adder unit 32 as compared to a slower alternative in which the carry outputs of the mantissa adders 44 and 66 are fed directly into the exponent adders 42 and 60, respectively, to control the incrementing of the exponent values.

The exponent result multiplexor 62 provides the exponent result to the exception detection logic 70. If an exception condition is detected, then the exception detection logic 70 will provide a default value (e.g. 80-bit result) to the write-back multiplexor 76. If no exception conditions exist, the exception detection logic 70 will provide a control signal to the write-back multiplexor 76, thereby allowing the multiplexor to transfer the result exponent value along with the postnormalized mantissa and a sign bit ("normal" result) to the register file 26. Thus, the default value or the normal result, as the case may be, is written back to the register file 26, via the write-back busses 34.

The implementation of adder unit 32 has several disadvantages. The first disadvantage involves the handling of mantissa overflows. For example, the carry output of adder 44, must drive both the mantissa sum multiplexor 50 and exponent increment multiplexor 46. This results in significant loading on the critical carry output signal (e.g. 80-bits of two-input multiplexors for IEEE double extended precision floating-point numbers), and therefore, will limit the add cycle time. The second disadvantage involves the critical path from the output of the leading zero detect logic 52 through the exponent adjust adder 58, and the exponent round adder 60—the output of which feeds the exponent result multiplexor 62. Essentially, in adder unit 32, the critical path formed to generate the exponent result value provides a major limitation on the add cycle time.

Thus, it is desirable to provide a unified method for postnormalization of floating-point operands which maximizes performance, while minimizing the necessary logic required for implementation of the method.

SUMMARY OF THE INVENTION

In a data processor having a register file for storing a plurality of data operands, each of the data operands having a mantissa portion and an exponent portion and a sign bit, and an execution unit for executing a plurality of floating-point operations using a selected number of the plurality of floating-point data operands, a method for performing postnormalization during a floating-point addition/subtraction operation to determine a final floating-point result.

The execution unit adds the mantissa portion of a first data operand to the mantissa portion of a second data operand to generate a prenormalized mantissa sum, while simultaneously incrementing the exponent portion of a larger one of the first data operand and the second data operand to generate an incremented exponent. The prenormalized mantissa sum is normalized by determining a number of leading zero bits in the prenormalized mantissa sum and providing an output signal representing the number of leading zero bits, thereby generating a post normalized mantissa sum.

The postnormalized mantissa sum is rounded to provide a rounded mantissa value and an overflow output signal, while the incremented exponent is simultaneously adjusted to generate a first exponent result value and a second exponent result value. Based upon a value of the overflow output signal, either the first exponent result or the second exponent result as a final exponent result is selected. The final exponent result, the rounded mantissa value and a result sign bit are provided to the register file as the final floating-point result.

DETAILED DESCRIPTION OF A PREFERRED EMBODIMENT

Figure 3:
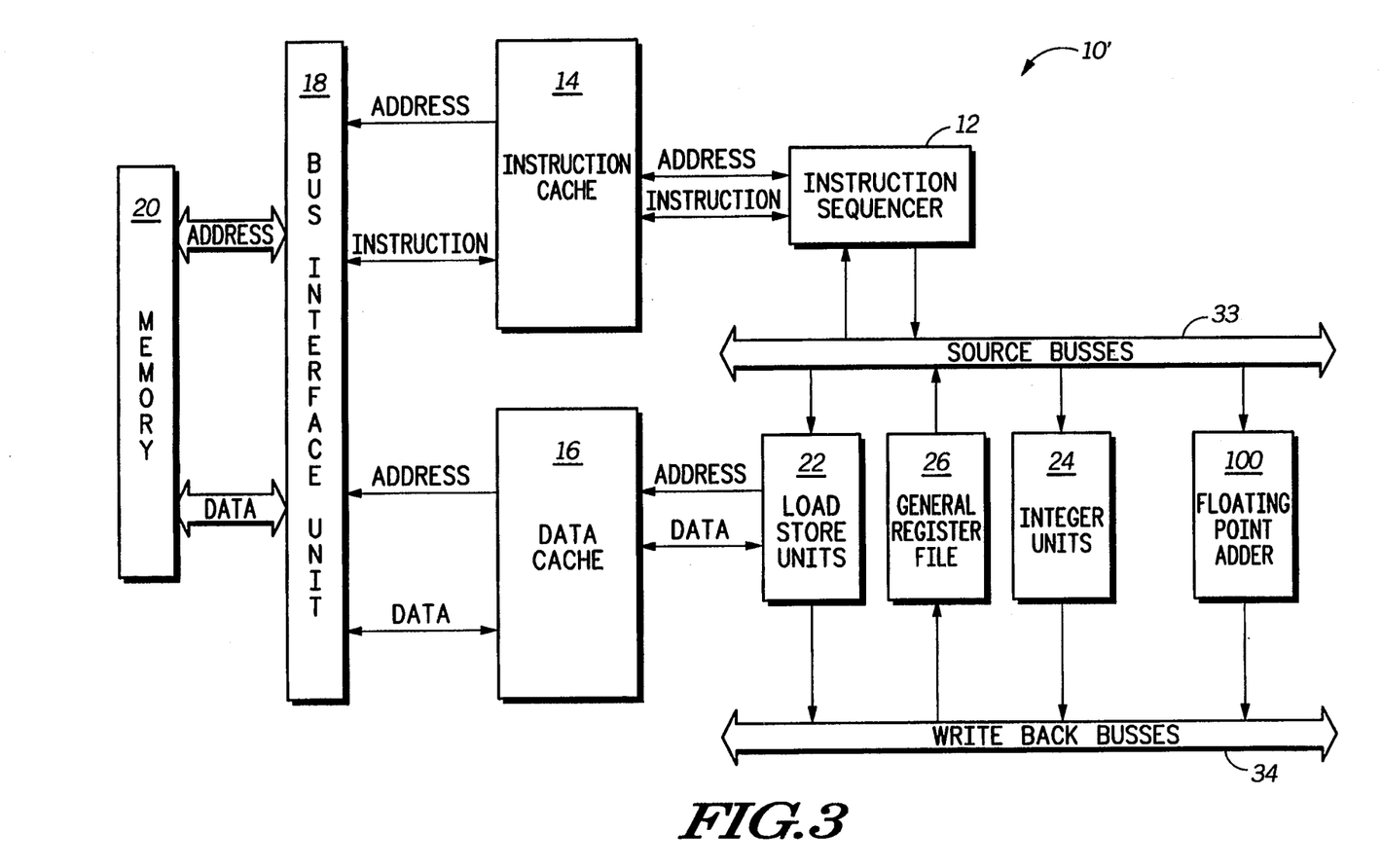
FIG. 3 illustrates in block diagram form a data processing system having a floating-point adder unit for performing a floating-point add operation in accordance with the present invention.
Figure 4:
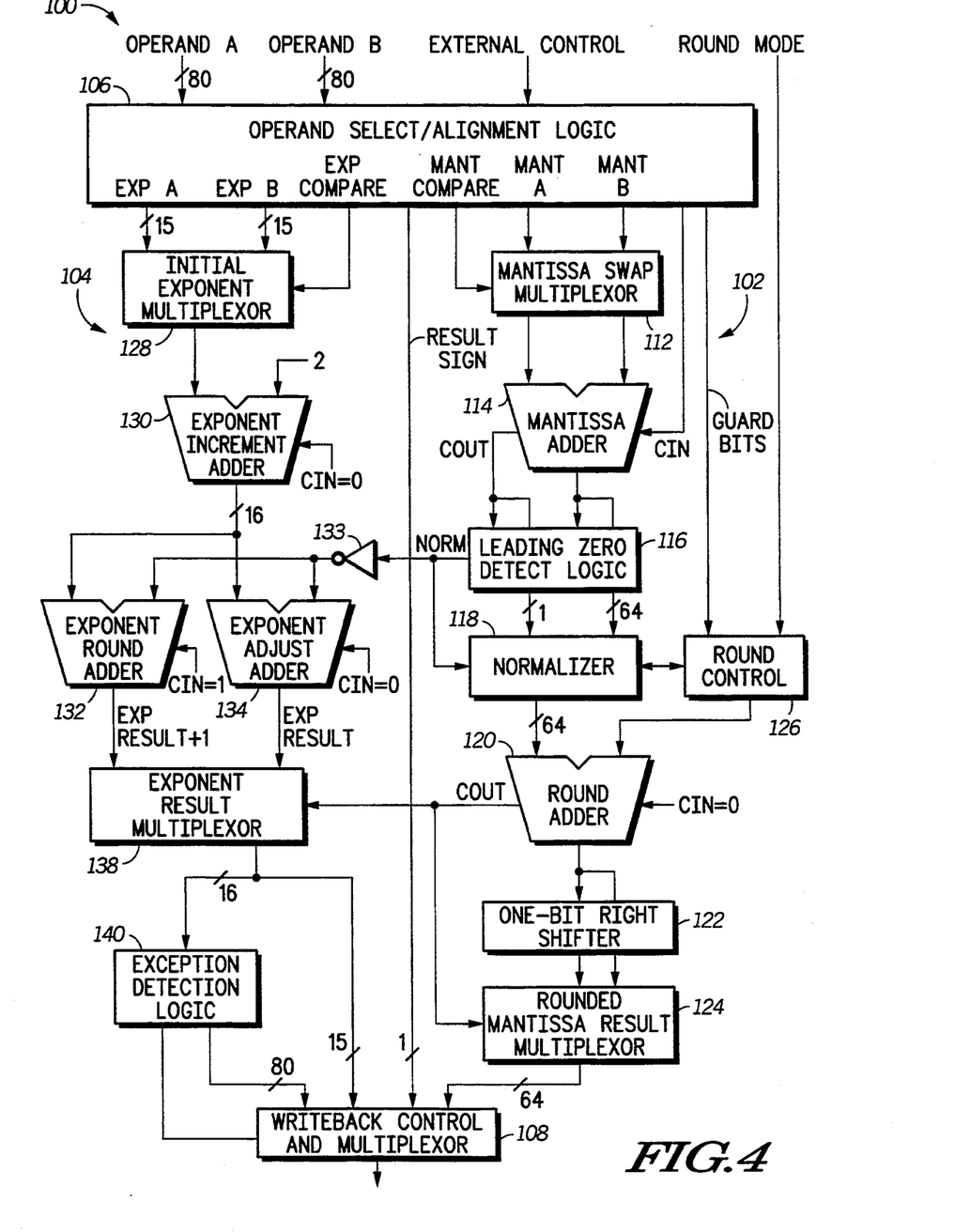
FIG. 4 illustrates in block diagram form the floating-point adder unit of FIG. 3, in accordance with the present invention.

Illustrated in FIG. 4 is a floating-point adder unit 100 for performing a floating-point add operation, in accordance with the present invention. The floating-point adder unit 100 may be used in conjunction with the data processing system 10 illustrated in FIG. 1. Accordingly, illustrated in FIG. 3 is a preferred embodiment data processing system 10' including the floating-point adder 100 of the present invention. In FIG. 3, analogous elements to those of FIG. 1 are numbered the same. Accordingly, data processing system 10' comprises an instruction sequencer 12, an instruction cache 14, a data cache 16, a bus interface unit 18, an external memory 20, load/store units 22, integer execution units 24, a register file 26, and the floating-point add unit 100 of the present invention. The instruction sequencer 12 provides control over the data flow between execution units 22, 24 and 100, and the register file 26. The instruction sequencer 12 implements a 4-stage (fetch-decode-execute-writeback) master instruction pipeline, enforces data interlocks, dispatches (issues) instructions to available execution units 22, 24 and 100, and directs data from the register file 26 onto and off of the busses 33 and 34.

In accordance with the preferred embodiment, a large 32-word general purpose register file (GRF) 26 provides operands for integer, logical, bit-field, memory addressing, and floating-point operations. There are two writeback busses 34 available to the execution units 22, 24 and 100. For the purpose of simplification, the term "write-back" will be used when a particular execution unit transfers information onto one of the two buses comprising the writeback busses 34. Execution units 22, 24 and 100 are each independent functional units with their own internally controlled pipelines. When an execution unit finishes execution of an instruction it places the result data onto a writeback bus 34. The register file 26 takes the data off the writeback busses 34 and store it into the correct destination register. If another instruction is waiting for this data, it is "forwarded" past the register file 26 directly into the appropriate execution unit(s). This allows a data dependent instruction to issue on the same clock as the writeback of the previous independent instruction, without waiting for the data to be written into the register file and read back out again. Since different execution units have different pipeline lengths, it is possible for more than two instructions to be completing in a given clock cycle. Consequently, execution units 22, 24 and 100 arbitrate for an available slot on a writeback bus 34. The highest writeback priority is granted to single-cycle execution units, such as the integer units 24, so that single-cycle instructions are always guaranteed a writeback slot while multi-stage pipeline units, such as floating-point adder unit 100 and load/store units 22, arbitrate for writeback slots. Pipelined execution units which are denied a writeback slot, will continue to advance their internal pipeline stages and accept new instructions until all pipeline stages are full.

In the preferred embodiment, the floating-point adder unit 100 runs concurrently with all other execution units 22 and 24 and any mix of integer, memory, and floating-point operations can be issued together in the same clock. The results produced by the floating-point adder unit 100 are exact IEEE results with no software fix-up required. Referring again to FIG. 4, the floating-point adder unit 100 comprises a mantissa data path portion 102, an exponent data path portion 104, operand select/alignment logic 106, and write-back logic 108. The mantissa data path logic 102 comprises a mantissa swap multiplexor 112, mantissa adder 114, leading zero detect logic 116, normalizer 118, mantissa round adder 120, right shifter 122, and rounded mantissa result multiplexor 124. The exponent data path portion 104 comprises an initial exponent multiplexor 128, an exponent increment adder 130, an exponent round adder 132, an exponent adjust adder 134, an exponent result multiplexor 138, and exception detection logic 140. The write-back logic 108 performs the re-alignment of the final add or subtract result into the proper floating-point data format based upon the precision designated by the issued floating-point instruction.

In accordance with the preferred embodiment, for any given floating-point instruction (e.g. add, subtract), the operands (A and B) are sourced from the general register file 26, via the source busses 33, or the write-back busses 34. In a conventional manner, control signals from the sequencer 12 are driven to the floating-point adder unit 100 to indicate which bus 33 or 34 will provide the source operands (A and B). Upon completion of the floating-point instruction, the write-back logic 108 transfers the computed result to the register file 26, via the write-back busses 34.

Depending upon the type of instruction being executed by the floating-point adder unit 100, the operands may be integers, or floating-point numbers of single, double or extended precision, represented in the IEEE floating-point format. In the preferred embodiment, all operands are driven onto the source busses 33 or write-back busses 34 aligned to the Sign (S) bit (which is the most significant bit (MSB) of the operands), regardless of the size or precision. In the preferred embodiment, two instructions may be issued to different execution units 22, 24 and 100 by the sequencer 12 on each clock, one in instruction slot zero, and the other in instruction slot one. For each instruction slot, there are two source busses 33, s0_b[0] or s1_b[0] and s0_b[1] and s1_b[1] which are driven from the register file 26. Furthermore, there are two write-back busses 34. Thus, in the preferred embodiment, the first operand (A) may: (1) come from the source one busses, either s1_b[0] or s1_b[1] (depending upon whether the sequencer 12 issued the instruction in instruction slot zero or instruction slot one); or (2) be fed forward from the write-back bus zero (wb_b[0]); or (3) be fed forward from the write-back bus one (wb_b[1]). Similarly, the second operand (B) may: (1) come from the source two busses (either s2_b[0] or s2_b[1]); or (2) be fed forward from the write-back bus zero; or (3) be fed forward from the write-back bus one. In all cases, the operands (A and B) are driven onto the busses 33 or 34 aligned to their sign bits (MSB), regardless of the precision.

Figure 5:
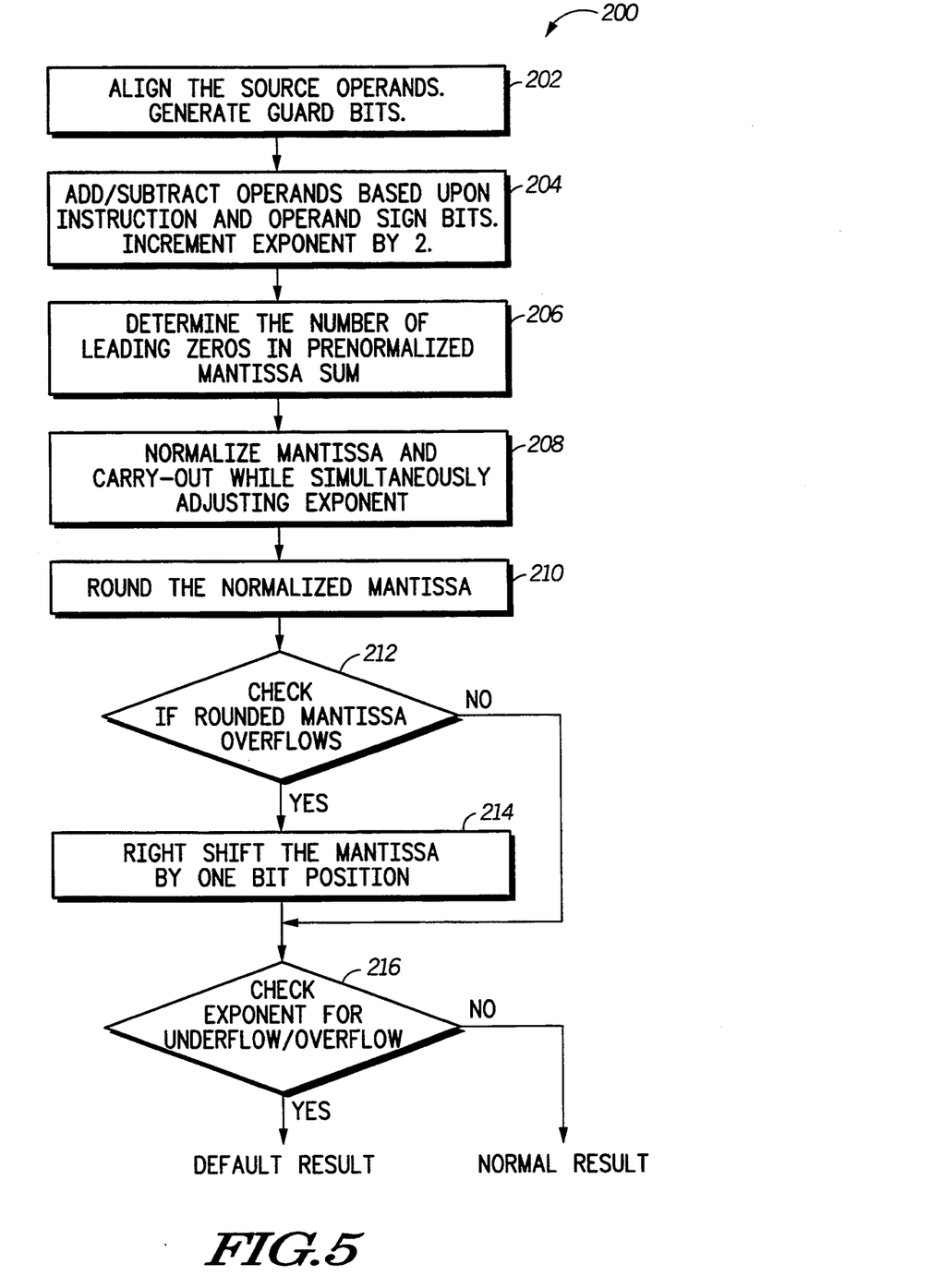
FIG. 5 is a flow diagram illustrating a floating-point add operation, in accordance with the present invention.

In the present invention, floating-point adder unit 100 performs a floating-point add or subtract operation to add/subtract two operands A and B, as illustrated in the flow diagram 200 of FIG. 5. Accordingly, at step 202, in response to EXTERNAL CONTROL signals generated by the sequencer 12, the operand select/alignment logic 106 selects the appropriate busses 33 or 34 from which to receive the incoming operands (operand A and operand B). The operand select/alignment logic 106 then performs a first alignment of the operands into the double extended precision format which is used internally by the floating-point adder unit 100. A second alignment is performed by the operand select/alignment logic 106 to align the operands A and B so that their exponent are equal. During the operand alignment operation, the guard bits are generated during the right-shifting of the mantissas. The operand select/alignment logic 106 provides the guard bits to the round control logic 126.

At step 204, the floating-point adder unit 100 begins to perform the "effective" add or effective" subtract operation, based upon the instruction issued from the sequencer 12 (FIG. 4) and the Sign bits of operands A and B, as indicated in Table I below.

TABLE I

| ISSUED INSTRUCTION | SIGN BIT OPERAND A | SIGN BIT OPERAND B | EFFECTIVE OPERATION |
| --- | --- | --- | --- |
| ADD | 0 | 0 | ADD |
| ADD | 0 | 1 | SUBTRACT |
| ADD | 1 | 0 | SUBTRACT |
| ADD | 1 | 1 | ADD |
| SUBTRACT | 0 | 0 | SUBTRACT |
| SUBTRACT | 0 | 1 | ADD |
| SUBTRACT | 1 | 0 | ADD |
| SUBTRACT | 1 | 1 | SUBTRACT |

The operand select/alignment logic 106 performs an exponent compare operation, as described in a patent application entitled IN A DATA PROCESSOR A METHOD AND APPARATUS FOR PERFORMING A FLOATING-POINT COMPARISON OPERATION" Ser. No. 07/941,011 filed on Sep. 4, 1992 and assigned to the assignee hereof. Accordingly, in response to receiving an EXPONENT COMPARE signal from operand select/alignment logic 106, the initial exponent multiplexor 128 provides exponent (EXPA or EXPB) of the operand larger in magnitude to the exponent increment adder 130. The exponent increment adder 130 increments the initial exponent (EXPA or EXPB) by two, and provides as an output an "incremented exponent". In parallel, the mantissa adder 114 performs the effective addition or subtraction of the mantissas of operands A and B, MANTA and MANTB, respectively, and provides as an output a "prenormalized mantissa sum". In the preferred embodiment, the prenormalized mantissa sum is a 65-bit value comprising one carry bit, and a 64-bit mantissa value.

At step 206, the leading zero detect logic 116 determines the number of leading zeros in the prenormalized mantissa sum, and provides as an output a 6-bit encoded value ("NORM") representing the number of leading zero bits detected in the 65-bit prenormalized mantissa sum. The NORM value is provided to the exponent round adder 132, the exponent adjust adder 134, and the mantissa normalizer 118, as illustrated in FIG. 4.

In response to receiving the NORM value, at step 208, the mantissa normalizer 118 left-shifts the prenormalized mantissa sum by the number of bits encoded in the NORM value, thereby generating a postnormalized mantissa sum. In parallel, the exponent adjust adder 134 subtracts the 6-bit NORM value from the incremented exponent value (provided by the exponent increment adder 130) to generate an exponent result value (EXP RESULT), while the exponent round adder 132 simultaneously computes the exponent result value plus one (EXP RESULT+1). The EXP RESULT+1 value is generated by the floating-point adder 100 in anticipation of a subsequent overflow condition occurring as a result of performing the mantissa rounding operation at step 210.

At step 210, the floating-point adder unit 100 performs a mantissa rounding operation. Depending upon the NORM value, the final floating-point add/subtract result, the mantissa normalizer 118 left-shifts the prenormalized mantissa sum to allow a predetermined number of the guard bits to be inserted in the least significant bit positions of the prenormalized mantissa sum, thereby generating a postnormalized mantissa sum. Based upon the precision of final floating-point add/subtract result, the round control logic 126 generates a ROUND signal indicating the value to be added to the postnormalized mantissa value in order to produce a rounded result value which is compliant with the floating-point arithmetic standard set forth in IEEE-754 1985 specification. Accordingly, the increment mantissa round adder 120 receives the postnormalized mantissa sum and a ROUND control signal, and provides as an output a 64-bit rounded mantissa value and a carry output signal. At step 212 of the floating-point add/subtract operation of the present invention, the floating-point adder 100 determines whether the rounding of the postnormalized mantissa value caused an overflow condition to occur by examining the carry output signal generated by the mantissa round adder 120.

At step 214, the right shifter 122 will shift the rounded mantissa value one bit to the right, thereby generating a right-shifted rounded mantissa value. Based upon the determination at step 212, the rounded mantissa result multiplexor 124 will select either the right-shifted rounded mantissa value or the post normalized mantissa value to provided to the write-back control logic 108 as the final 64-bit mantissa result. In parallel, the exponent result multiplexor 138 selects either the EXP RESULT or the EXP RESULT+1 to be provided to the write-back control logic 108 as the final 15-bit exponent result, based upon the value of the carry output signal generated by the mantissa round adder 120.

At step 216, the exception detection logic 140 determines whether an IEEE exception condition occurred. If an IEEE exception occurred, at step 218, the exception detection logic 140 will provide an 80-bit default value to the write-back control logic 108, to be written back to the register file 26, via the write-back busses 34. Otherwise, the exception detection logic 140 will instruct the write-back control logic 108 to write-back the final 15-bit exponent result to the register file 26, via the write-back busses 34.

Thus, in the preferred embodiment of the present invention, the floating-point adder 100 minimizes critical path delays to allow high-performance floating-point calculations while simultaneously reducing logic. Instead of treating the prenormalized mantissa sum as a 64-bit value with special treatment in case of a carry out due to overflow as in the prior art of FIG. 2, the floating-point adder 100 of the present invention treats the prenormalized mantissa sum as a 65-bit value, with the carry out of mantissa adder 114 being the most significant bit. This eliminates the need for the right shifter 48 and mantissa sum multiplexor 50 of the prior art floating-point adder unit 32. Instead of conditionally incrementing the initial exponent value, as taught by the use of the exponent increment multiplexor 46 of prior art, in the present invention, the initial exponent value is always incremented (to account for the extra significant bit). Thus, since the need for multiplexors 46 and 50 of adder unit 32 (FIG. 2) are eliminated in the present invention, the loading on the carry output is minimized in the present invention.

Furthermore, the critical path in the present invention is from the leading zero detect logic 116, to exponent adders 132 and 134 (in parallel), and to the exponent selection multiplexor 138, thereby allowing the floating-point adder unit 100 to perform the exponent adjustments for normalization and for rounding faster than the prior art. Conceptually, the present invention subtracts the exponent adjust value encoded in the NORM signal from both the incremented exponent (via adder 134) and the incremented exponent plus one (via adder 132). In the present invention, to subtract the exponent adjust value, encoded in the NORM signal, and to increment the initial exponent value, the exponent round adder 132 must be supplied with a carry input of two. This requirement does not work with the normal adder 42 (FIG. 2) taught in the prior art. In the present invention, the carry input requirement of exponent adders 132 and 134 is satisfied by providing a carry input of one back to the exponent increment adder 130. Thus, in the present invention, the initial exponent into exponent adder 130 is always incremented by two, as illustrated in FIG. 4. As previously indicated, the removal of multiplexors 46 and 50 (FIG. 2) taught in the prior art enables the movement of the carry input of one as herein described.

Accordingly, the present invention has several advantages over the prior art. First, it addresses a critical path timing problem in the case where the carry out of the mantissa adder 114 must drive the large multiplexors. At the same time that it addresses this timing problem, it removes logic from the design, thus simplifying the structure. This method also has the advantage in that it removes one exponent adder delay from a critical path without adding any additional logic. This is very important in allowing the floating-point adder to meet cycle time requirements. Thus, while the present invention has been described in accordance with a preferred embodiment, it should be apparent to one of skill in the art that the invention may be practiced in numerous ways. Accordingly, it is intended by the appended claims to cover all modifications of the invention which fall within the true spirit and scope of the invention.

We claim:

1. In a data processor having a register file for storing a plurality of floating-point data operands, each of the floating-point data operands having a mantissa portion, an exponent portion and a sign bit, and an execution unit for executing a plurality of floating-point operations using a selected number of the plurality of floating-point data operands, a method for performing a floating-point addition/subtraction operation to determine a final floating-point result, the method comprising the steps of:

adding, via a mantissa adder, said mantissa portion of a first data operand to said mantissa portion of a second data operand to generate a prenormalized mantissa sum comprising a mantissa value and a carry bit, while simultaneously incrementing, via an exponent incrementer, said exponent portion of a larger one of said first data operand and said second data operand by two to generate an incremented exponent;

normalizing, via a first logic portion, the prenormalized mantissa sum, to generate a post normalized mantissa sum, said first logic portion determining a number of leading zero bits in said prenormalized mantissa sum and providing an encoded value as an output signal, said encoded value representing said number of leading zero bits;

rounding, via a rounding logic portion, said postnormalized mantissa sum and providing a rounded mantissa value and an overflow output signal, while simultaneously subtracting, via an exponent round adder, said encoded value from said incremented exponent to generate a first exponent result value and adjusting said incremented exponent via an exponent adjust adder, to generate a second exponent result value;

selecting, via a select logic portion based upon a value of said overflow output signal, either said first exponent result or said second exponent result as a final exponent result; and providing, via a writeback logic portion, said final exponent result, said rounded mantissa value and a result sign bit in said register file as said final floating-point result.

2. The method of claim 1 further comprising the steps of:

determiningwhether an overflow condition occurred as a result of performing said rounding of said postnormalized mantissa sum by examining said overflow output signal generated by said rounding logic portion; and performing, via a shifter, a one bit right-shift of said rounded mantissa value to generate a right shifted mantissa value.

3. The method of claim 1 further comprising the step of providing, via an exception detect logic portion, a default value as said final floating-point result when an exception condition occurred as a result of performing said floating-point addition/subtraction operation.

4. The method of claim 1 further comprising the step of aligning, via alignment logic, said first data operand and said second data operand into a predetermined internal data format for said floating-point execution unit.

5. In a data processor having a register file for storing a plurality of floating-point data operands, each of said floating-point data operands having a mantissa portion, an exponent portion and a sign bit, and an execution unit for executing a plurality of floating-point operations using a selected number of said plurality of floating-point data operands, a method for performing postnormalization during a floating-point addition/subtraction operation to determine a final floating-point result, said method comprising the steps of:

adding, via a mantissa adder, said mantissa portion of a first data operand to said mantissa portion of a second data operand to generate a prenormalized mantissa sum comprising a mantissa value and a carry bit, while simultaneously incrementing, via an exponent incrementer said exponent portion of a larger one of said first data operand and said second data operand by two to generate an incremented exponent;

normalizing, via a first logic portion, the prenormalized mantissa sum, to generate a post normalized mantissa sum, said first logic portion determining a number of leading zero bits in said prenormalized mantissa sum and providing an encoded value as an output signal representing said number of leading zero bits;

rounding, via a rounding logic portion, said postnormalized mantissa sum and providing a rounded mantissa value and a overflow output signal, while simultaneously adjusting, via an exponent adjust adder said incremented exponent to generate a first exponent result value and a second exponent result value;

performing, via a shifter, a one bit right-shift of said rounded mantissa value to generate a right shifted mantissa value when an overflow condition occurred as a result of performing said rounding of said postnormalized mantissa sum;

selecting, via a select logic portion, based upon a value of said overflow output signal, either said first exponent result or said second exponent result as a final exponent result; and providing, via a writeback logic portion said final exponent result, said rounded mantissa value and a result sign bit in said register file as said final floating-point result.

6. The method of claim 5 further comprising the step of providing, via an exception detect logic portion, a default value as said final floating-point result when an exception condition occurred as a result of performing said floating-point addition/subtraction operation.

7. The method of claim 5 further comprising the step of aligning, via alignment logic, said first data operand and said second data operand into a predetermined internal data format based of said floating-point execution unit.

8. A data processor having a register file, for storing a plurality of floating-point data operands, where each of said floating-point data operand has a mantissa portion, an exponent portion, and a sign bit, and a floating-point execution unit for performing a floating-point addition/subtraction operation to determine a floating-point result, said execution unit comprising:

mantissa logic circuitry for adding said mantissa portion of a first data operand to said mantissa portion of a second data operand to generate a prenormalized mantissa sum comprising a mantissa value and a carry bit, and for normalizing the prenormalized mantissa sum, to generate a post normalized mantissa sum, said mantissa logic circuitry determining an encoded value representing a number of leading zero bits in said prenormalized mantissa sum and generating a first output signal representing said encoded value, said mantissa logic circuitry leftshifting said prenormalized mantissa sum by said encoded value to generate said post normalized mantissa sum, and rounding said postnormalized mantissa sum to provide a rounded mantissa value as a mantissa result, and said mantissa logic circuitry examining a carry output signal generated during rounding of said postnormalized mantissa value to determine whether an overflow condition occurred and providing an overflow output signal indicative thereof, exponent logic circuitry coupled to said mantissa logic circuitry for incrementing said exponent portion of a larger one of said first data operand and said second data operand by two to generate an incremented exponent, and for subtracting said encoded value from said incremented exponent to generate a first exponent result value, and adjusting said incremented exponent to generate a second exponent result value, in response to receiving said first output signal from said mantissa logic circuitry, said exponent logic circuitry receiving said overflow output signal from said mantissa logic circuitry and selecting either said first exponent result or said second exponent result as a final exponent result, in response thereto; and writeback control logic circuitry coupled to said mantissa logic circuitry and said exponent logic circuitry for providing said final exponent result, said mantissa result and a result sign bit to said register file as said final floating-point result.

9. The floating-point execution unit of claim 8 further comprising:

alignment logic coupled to said mantissa logic circuitry for aligning said first data operand and said second data operand into a predetermined internal data format of said floating-point execution unit, and for aligning said exponent portion of said first data operand and said exponent portion of said second data operand; and round control logic coupled to said alignment logic for receiving a predetermined number of guard bits generated by said fourth means during alignment of said exponent portion of said first data operand and said second data operand, said round control logic generating a round control signal indicating a value to be added, by said mantissa logic portion, to said post normalized mantissa value to generate said rounded mantissa value.

10. The floating-point execution unit of claim 8 further comprising exception detection logic coupled to said writeback control logic circuitry for detecting when an exception condition occurred as a result of performing said floating-point addition/subtraction operation, and for providing a default value as said final floating-point result in response to detecting said exception condition.

11. The floating-point execution unit of claim 8 wherein said mantissa logic circuitry comprises:

a first mantissa adder for receiving said first data operand and said second data operand and for adding said mantissa portion of said first data operand to said mantissa portion of said second data operand and to generate said prenormalized mantissa sum, a leading zero detector coupled to said first mantissa adder for determining a number of leading zero bits in said prenormalized mantissa sum and for providing said encoded value as said first output signal representing said number of leading zero bits;

a normalizing logic portion coupled to said leading zero detector for normalizing the prenormalized mantissa sum, to generate a post normalized mantissa sum;

a second mantissa adder for rounding said postnormalized mantissa sum and providing a rounded mantissa value and said overflow output signal; and a mantissa selector coupled to said second mantissa adder for receiving said overflow output signal from said mantissa logic circuitry and for performing a one bit right-shift of said rounded mantissa value to generate a right shifted mantissa value, said mantissa selector providing said right-shifted mantissa value to said write-back logic circuitry as said mantissa result value, when said overflow output signal indicates said overflow condition occurred.

12. The floating-point execution unit of claim 8 wherein said exponent logic circuitry comprises:

a first exponent adder for incrementing said exponent portion of said larger one of said first data operand and said second data operand to generate said incremented exponent;

a second exponent adder coupled to said first exponent adder for adjusting said incremented exponent to generate said first exponent result value and said second exponent result value, in response to receiving said first output signal from said leading zero detect means; and an exponent selector coupled to said second exponent adder for receiving said overflow output signal from said mantissa logic circuitry and selecting either said first exponent result or said second exponent result as a final exponent result, in response thereto.

13. The floating-point execution unit of claim 8 wherein said write-back logic circuitry is coupled to said exception detection logic, said exponent selector and said mantissa selector, for providing said final exponent result, said final mantissa value and a result sign bit to said register file as said final floating-point result, said writeback control logic circuitry providing said default value to said register file as said final floating-point result when said exception condition occurs.

* * * * *